(12) United States Patent
Rambo

(10) Patent No.: US 11,686,537 B2
(45) Date of Patent: Jun. 27, 2023

(54) HEAT EXCHANGERS AND METHODS OF MANUFACTURING THE SAME

(71) Applicant: General Electric Company, Schenectady, NY (US)

(72) Inventor: Jeffrey Douglas Rambo, Evendale, OH (US)

(73) Assignee: General Electric Company, Schenectady, NY (US)

(*) Notice: Subject to any disclaimer, the term of this patent is extended or adjusted under 35 U.S.C. 154(b) by 121 days.

(21) Appl. No.: 17/223,284

(22) Filed: Apr. 6, 2021

(65) Prior Publication Data

US 2022/0316815 A1    Oct. 6, 2022

(51) Int. Cl.
*B23K 20/02* (2006.01)
*B23P 15/26* (2006.01)
(Continued)

(52) U.S. Cl.
CPC ............ *F28F 3/025* (2013.01); *B23K 20/002* (2013.01); *B23K 20/02* (2013.01); *B23P 15/26* (2013.01); *B33Y 40/20* (2020.01); *B33Y 80/00* (2014.12); *B23K 2101/14* (2018.08); *B33Y 10/00* (2014.12); *F28F 2275/061* (2013.01)

(58) Field of Classification Search
CPC ...... F28F 3/025; F28F 2275/061; F28F 3/086; F28F 7/02; F28F 2275/14; F28F 2280/04; F28F 3/048; F28F 3/08; B23K 20/002; B23K 20/02; B23K 2101/14; B23P 15/26;
(Continued)

(56) References Cited

U.S. PATENT DOCUMENTS 4,749,032 A * 6/1988 Rosman .................. F28D 9/0037
29/890.039
5,383,517 A * 1/1995 Dierbeck .............. F28D 1/0246
29/890.039
(Continued)

FOREIGN PATENT DOCUMENTS

CN    204255152 U    4/2015
CN    107262914 A    10/2017
(Continued)

OTHER PUBLICATIONS

Siw, "Effects of Pin Detached Space on Heat Transfer and Pin-Fin Arrays" ASME, Journal of Heat Transfer, Aug. 2012, vol. 134.
(Continued)

*Primary Examiner* — Lawrence Averick
(74) *Attorney, Agent, or Firm* — Dinsmore & Shohl LLP

(57) ABSTRACT

A method of manufacturing a heat exchanger is provided. The method includes forming a first substrate by additively manufacturing a body defining a first outer surface and a second outer surface opposite the first outer surface, a first partial fluid flow channel formed within the first outer surface, a second partial fluid flow channel formed within the second outer surface, and at least one internal fluid flow channel completely formed within the body, and coupling the first substrate to a second substrate including a partial fluid flow channel formed within a surface of the second substrate such that the first partial fluid flow channel of the first substrate and the partial fluid flow channel of the second substrate combine to form a combined fluid flow channel.

20 Claims, 7 Drawing Sheets

(51) Int. Cl.
   *F28F 3/02*      (2006.01)
   *B33Y 80/00*     (2015.01)
   *B23K 20/00*     (2006.01)
   *B33Y 40/20*     (2020.01)
   *B33Y 10/00*     (2015.01)
   *B23K 101/14*    (2006.01)

(58) Field of Classification Search
   CPC ......... B33Y 40/20; B33Y 80/00; B33Y 10/00;
                                             F28D 9/0081
   See application file for complete search history.

(56)                References Cited

U.S. PATENT DOCUMENTS

| | | | |
|---|---|---|---|
| 7,111,672 | B2 | 9/2006 | Symonds |
| 7,334,631 | B2 | 2/2008 | Kato et al. |
| 7,445,040 | B2 | 11/2008 | Szulman et al. |
| 7,810,552 | B2* | 10/2010 | Slaughter .................. F28F 7/02 |
| | | | 430/269 |
| 9,174,312 | B2 | 11/2015 | Baughman et al. |
| 9,574,828 | B2 | 2/2017 | Van Dijck et al. |
| 9,746,257 | B2 | 8/2017 | Fennessy |
| 9,796,048 | B2 | 10/2017 | Lacy et al. |
| 9,905,319 | B2 | 2/2018 | Castanie et al. |
| 10,365,045 | B2* | 7/2019 | Choi ...................... F02M 21/06 |
| 10,372,110 | B2 | 8/2019 | Jagdale et al. |
| 10,399,191 | B2* | 9/2019 | Rigal .................... F28D 9/0081 |
| 10,429,132 | B2 | 10/2019 | Tonellato et al. |
| 10,823,511 | B2* | 11/2020 | Vargas ...................... F28F 1/42 |
| 11,306,979 | B2* | 4/2022 | Yun .......................... F28F 1/422 |
| 2008/0149313 | A1* | 6/2008 | Slaughter ................ B22F 10/28 |
| | | | 430/269 |
| 2015/0240722 | A1 | 8/2015 | Loebig et al. |
| 2015/0316326 | A1* | 11/2015 | Choi ...................... F28F 19/006 |
| | | | 165/166 |
| 2016/0107274 | A1* | 4/2016 | Rigal .................... F28D 9/0037 |
| | | | 29/890.03 |
| 2017/0211898 | A1 | 7/2017 | Schwalm |
| 2018/0355990 | A1 | 12/2018 | Simpson |
| 2018/0372416 | A1* | 12/2018 | Vargas ...................... F28F 1/42 |
| 2019/0049187 | A1 | 2/2019 | Zeidner et al. |
| 2019/0277576 | A1 | 9/2019 | Toubiana |
| 2019/0277579 | A1 | 9/2019 | Disori et al. |
| 2019/0301816 | A1 | 10/2019 | Yun et al. |
| 2020/0182559 | A1* | 6/2020 | Yun ........................ F28D 7/1661 |
| 2021/0116188 | A1* | 4/2021 | Roper .................... F28F 9/0204 |
| 2021/0333055 | A1* | 10/2021 | Colson .................. F28D 9/0081 |
| 2021/0398878 | A1* | 12/2021 | Choobineh ......... H01L 23/3672 |

FOREIGN PATENT DOCUMENTS

| | | |
|---|---|---|
| CN | 105290739 B | 9/2018 |
| EP | 0627065 B1 | 5/1999 |
| EP | 3034978 A1 | 6/2016 |
| EP | 2401571 B1 | 7/2018 |
| KR | 20140137433 A | 12/2014 |

OTHER PUBLICATIONS

Sparrow, "Natural Convection Heat Transfer from the Upper Plate of a Colinear, Separated Pair of Vertical Plates" ASME, Journal of Heat Transfer, Nov. 1980, vol. 102.

Moores, "Heat Transfer and Fluid Flow in Shrouded Pin Fin Arrays With and Without Tip Clearance" International Journal of Heat and Mass Transfer, Sep. 2009, pp. 5978-5989, vol. 52.

Extended European Search Report for Application No. 22161418.3 dated Aug. 26, 2022 (6 pages).

\* cited by examiner

HEAT EXCHANGERS AND METHODS OF MANUFACTURING THE SAME

TECHNICAL FIELD

The present specification generally relates to heat exchangers and methods of manufacturing the same and, more specifically, heat exchangers produced using additive manufacturing.

BACKGROUND

As background, heat exchangers may be conventionally produced through stacked plates that include etched, milled, or stamped grooves, which provide for fluid flow passages. However, etching flow passages may limit the shape of the flow passages to semi-circular flow passages with limited aspect (e.g., depth to width) ratios. Stamping fluid flow passages may provide limited channel depths and there may be limitations on plate thickness. Both etching/milling processes may result in relatively thick walls between plates. Additionally, the final layers and or assembly may be very heavy for the intended application or the final assembly may be difficult to inspect for leaks or other defects prior to service.

Accordingly, a need exists for alternative heat exchanges and methods for manufacturing the same that result in lighter weight layers than may be inspected prior to assembly.

SUMMARY

In an embodiment, a method of manufacturing a heat exchanger is provided. The method includes forming a first substrate by additively manufacturing a body defining a first outer surface and a second outer surface opposite the first outer surface, a first partial fluid flow channel formed within the first outer surface, a second partial fluid flow channel formed within the second outer surface, and at least one internal fluid flow channel completely formed within the body, and coupling the first substrate to a second substrate including a partial fluid flow channel formed within a surface of the second substrate such that the first partial fluid flow channel of the first substrate and the partial fluid flow channel of the second substrate combine to form a combined fluid flow channel.

In another embodiment, a method of manufacturing a heat exchanger is provided. The method includes forming a supporting substrate layer having a body defining a first outer surface and a second outer surface opposite the first outer surface, forming a first plurality of erect fins extending from the first outer surface of the supporting substrate layer, forming two or more attachment walls extending from the first outer surface of the supporting substrate layer a distance greater than the first plurality of erect fins, forming a non-supporting substrate layer having a body defining a first outer surface and a second outer surface opposite the first outer surface, forming a second plurality of erect fins extending from the first outer surface of the non-supporting substrate layer, and mounting the non-supporting substrate layer to the supporting substrate layer such that the two or more attachment walls engage the first outer surface of the non-supporting substrate layer and each adjacent fin of the first plurality of erect fins are separated by a fin of the second plurality of erect fins.

In yet another embodiment, a heat exchanger is provided. The heat exchanger includes a supporting substrate layer and a non-supporting substrate layer. The supporting substrate layer includes a body defining a first outer surface and a second outer surface opposite the first outer surface, a first plurality of erect fins extending from the first outer surface of the supporting substrate layer, and two or more attachment walls extending from the first outer surface of the supporting substrate layer a distance greater than the first plurality of erect fins. The non-supporting substrate layer includes a body defining a first outer surface and a second outer surface opposite the first outer surface, and a second plurality of erect fins extending from the first outer surface of the non-supporting substrate layer. The first outer surface of the non-supporting substrate layer is bonded to the two or more attachment walls of the supporting substrate layer and each adjacent fin of the first plurality of erect fins are separated by a fin of the second plurality of erect fins.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to heat exchangers and methods of manufacturing the same. Heat exchangers are devices that are used to transfer heat between two or more fluids. Heat exchangers may be used for engine cooling (e.g., in the aviation or vehicle industries), electronics cooling, or the like. In particular, heat exchangers according to the present disclosure may be useful in high-pressure environments (e.g., up to and/or including pressures of 10,000 psi or greater). Referring generally to the figures, various heat exchanger embodiments and methods of manufacturing are depicted. For example, heat exchangers, according to the present disclosure, may be additively manufactured by forming layers or substrates wherein each layer has partial and/or whole integrally formed flow channels and/or fins. The substrates may then be stacked and coupled to one another (e.g., through any joining process such as welding, brazing, and/or diffusion bonding). By forming heat exchangers in a layer-wise manufacturing process, each layer (plate) may be separately inspected for tolerances and defects prior to final assembly. In some embodiments, the whole integrally formed flow channels may be inspected by flowing a fluid through the encapsulated channels to test pressure loss and/or heat transfer characteristics. This ability to inspect prior to final assembly may overcome current limitations in monolithically formed heat exchangers, where it is difficult to inspect for tolerances and/or mechanical defects. In some embodiments, one or more of the plates (or each plate) may be additively manufactured through, for example, direct metal laser melting (DMLM), which may simplify the powder removal process and eliminate possible trapped powder. Additionally, forming a heat exchanger through layers may provide opportunity to coat, electroplate, and/or perform other types of surface treatments. These and additional embodiments and benefits of the present disclosure will be described in greater detail below.

Figure 1:
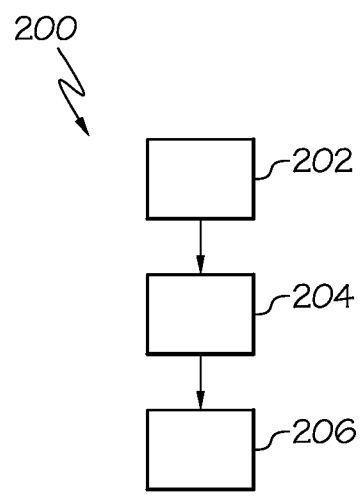
FIG. 1 depicts a method of manufacturing a heat exchanger, according to one or more embodiments shown and described herein.

Referring now to FIG. 1, a flow chart depicting a method 200 of manufacturing a heat exchanger according to one or more embodiments is depicted. As shown, the method 200 generally includes the steps of manufacturing one or more substrates (step 202), optionally, inspecting the two or more substrates (step 204), and coupling (e.g., diffusion bonding) the two or more substrates to form the assembled heat exchanger (step 206). These steps will be more fully described below. However, it is noted that a greater or fewer number of processing steps may be included without departing from the scope of the present disclosure. In particular, additional processing steps may be included. Such additional processing steps may be performed before and/or after diffusion bonding of the various layers to one another. For example, further processing steps may include, but are not limited to application of one or more coatings, electroplating, or other surface treatments.

Manufacturing two or more substrates may include forming a first substrate and a second substrate including the various features thereof, which will be described in greater detail below. In the various embodiments, the first and second substrate may be substantially identical to one another, or as will be described in more detail below, different from one another.

During production of a substrate for use as a layer of a heat exchanger (e.g., the heat exchanger core), the substrate may be formed with integral partial and/or whole fluid flow channels. A fluid flow channel, whether partial or whole, may include any structure formed within the substrate designed to provide a passage for fluid flow through or across the substrate. In some embodiments, the fluid flow channel(s) may incorporate enhanced heat transfer features such as, for example, dimples, turbulators, fins, or the like which may be used to increase heat transfer rate. Additional substrates may be formed as needed to meet the specifications of a particular heat exchanger. Formation may be done in a number of ways. For example, a plate of material (e.g., copper, titanium, steel, stainless steel, aluminum, graphite, ceramics, composites, or plastics) may be etched, milled, carved, and/or bored to form the various fluid flow channels. In other embodiments, the substrate may be formed by an additive manufacturing process (e.g., DMLM). As noted above, additive manufacturing may provide a multitude of benefits including, but not limited to, weight reduction, increased surface roughness, more consistent engineering parameters (e.g., conventional etched/milled plate designs typically result in variable wall thickness), and/or design freedom on passage cross-section shape, which is currently limited to semicircles in etching or other processes.

Figure 2A:
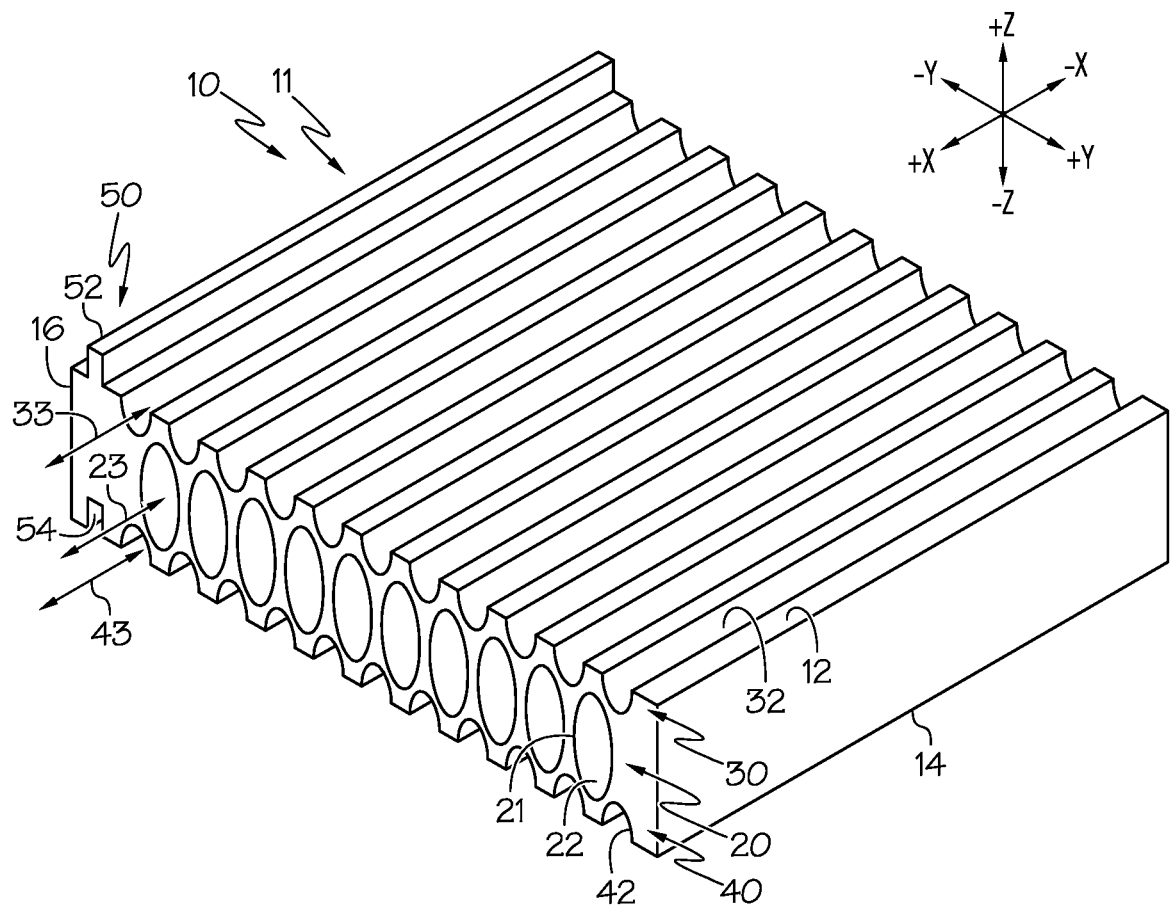
FIG. 2A depicts a perspective view of a substrate for use as a layer of a heat exchanger, according to one or more embodiments shown and described herein.
Figure 2B:
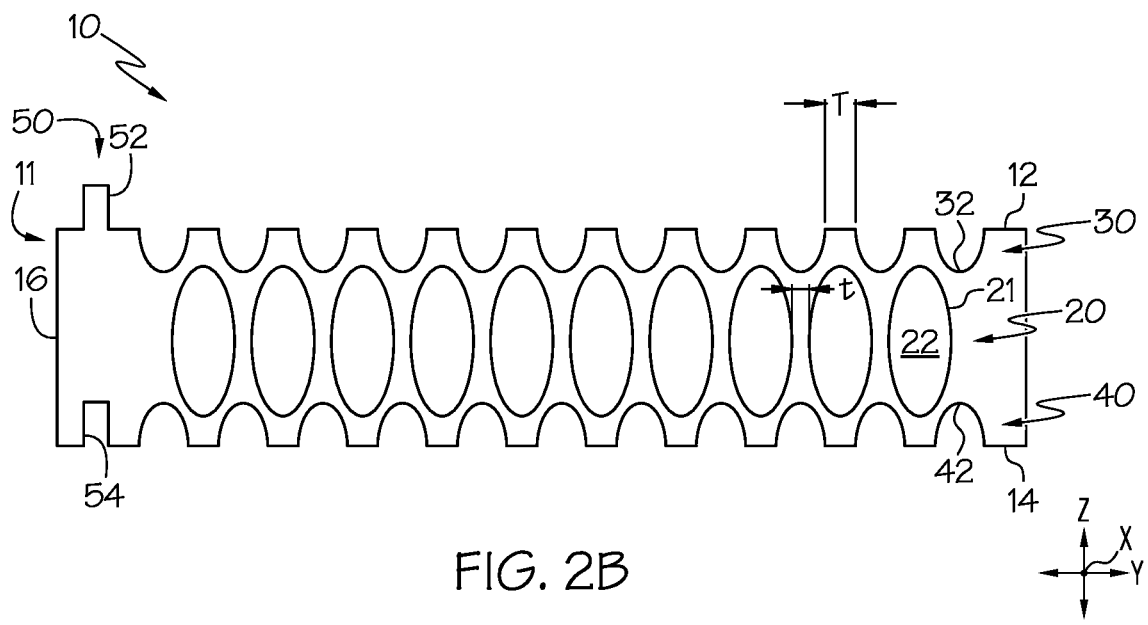
FIG. 2B depicts a side view of the substrate of FIG. 2A, according to one or more embodiments shown and described herein.

Referring now to FIGS. 2A-2B, a substrate 10 is generally depicted. In this embodiment, the substrate 10 includes a body 11 having a first outer surface 12, a second outer surface 14, and a sidewall 16 extending between the first outer surface 12 and the second outer surface 14. The first outer surface 12 and the second outer surface 14 may be generally parallel and coextensive with one another. The sidewall 16 may be perpendicular to both the first outer surface 12 and the second outer surface 14 and extend along an outer perimeter of the first outer surface 12 and the second outer surface 14. For example, where the overall shape of the heat exchanger 100 is rectangular, there may be four sidewalls.

One or more partial fluid flow channels 30 may be formed within the first outer surface 12 such that a first partial fluid flow channel 32 is formed within the first outer surface 12. The one or more partial fluid flow channels 30 may extend along the entire length of the first outer surface 12 (e.g., along the X direction of the depicted coordinate axes). The one or more partial fluid flow channels 30 may have any cross-sectional shape, for example, a portion of a circle, oval, rectangle, or any regular or irregular polygonal or non-polygonal shape. In the illustrated embodiment, the one or more partial fluid flow channels 30 include a plurality of partial fluid flow channels formed within the first outer surface 12, for example, two or more partial fluid flow channels, four or more partial fluid flow channels, six or more partial fluid flow channels, etc. Each of the partial fluid flow channels 30 may run parallel to each other across the substrate 10. Each of the one or more partial fluid flow channels 30 may have the same shape or different shapes.

One or more partial fluid flow channels 40 may be formed within the second outer surface 14 such that a second partial fluid flow channel 42 is formed within the second outer surface 14. The one or more partial fluid flow channels 40 may extend along the entire length of the second outer surface 14. The one or more partial fluid flow channels 40 may have any cross-sectional shape, for example, a portion of a circle, oval, rectangle, or any regular or irregular polygonal or non-polygonal shape. In the illustrated embodiment, the one or more partial fluid flow channels 40 include a plurality of second partial fluid flow channels formed within the second outer surface 14, for example, two or more partial fluid flow channels, four or more partial fluid flow channels, six or more partial fluid flow channels, etc. Each of the one or more partial fluid flow channels 40 may run parallel to each other across the substrate 10. Each of the first partial fluid flow channels 40 may have the same shape or different shapes.

In some embodiments, the number of partial fluid flow channels 30 of the first outer surface 12 is equal to the number of partial fluid flow channels 40 of the second outer surface 14. In other embodiments, the number of partial fluid flow channels 30 of the first outer surface 12 may be different that the number of partial fluid flow channels 40 of the second outer surface 14. Each of the partial fluid flow channels 30, 40 may have the same cross-sectional shapes, different cross-sectional shapes, or some combination thereof. In some embodiments, the one or more partial fluid flow channels 30 of the first outer surface 12 may be positioned directly opposite the one or more partial fluid flow channels 40 of the second outer surface 14, as illustrated in FIG. 2B. In other embodiments, the one or more partial fluid flow channels 30 of the first outer surface 12 may be laterally offset (e.g., in the Y direction of the depicted coordinate axes) from one or more partial fluid flow channels 40 of the second outer surface 14.

The one or more partial fluid flow channels 30, 40 may be formed integrally through additive manufacturing of the substrate 10, as noted above. However, in yet further embodiments, the one or more partial fluid flow channels 30, 40 may be manufactured through, carving, etching, milling, etc.

Figure 6:
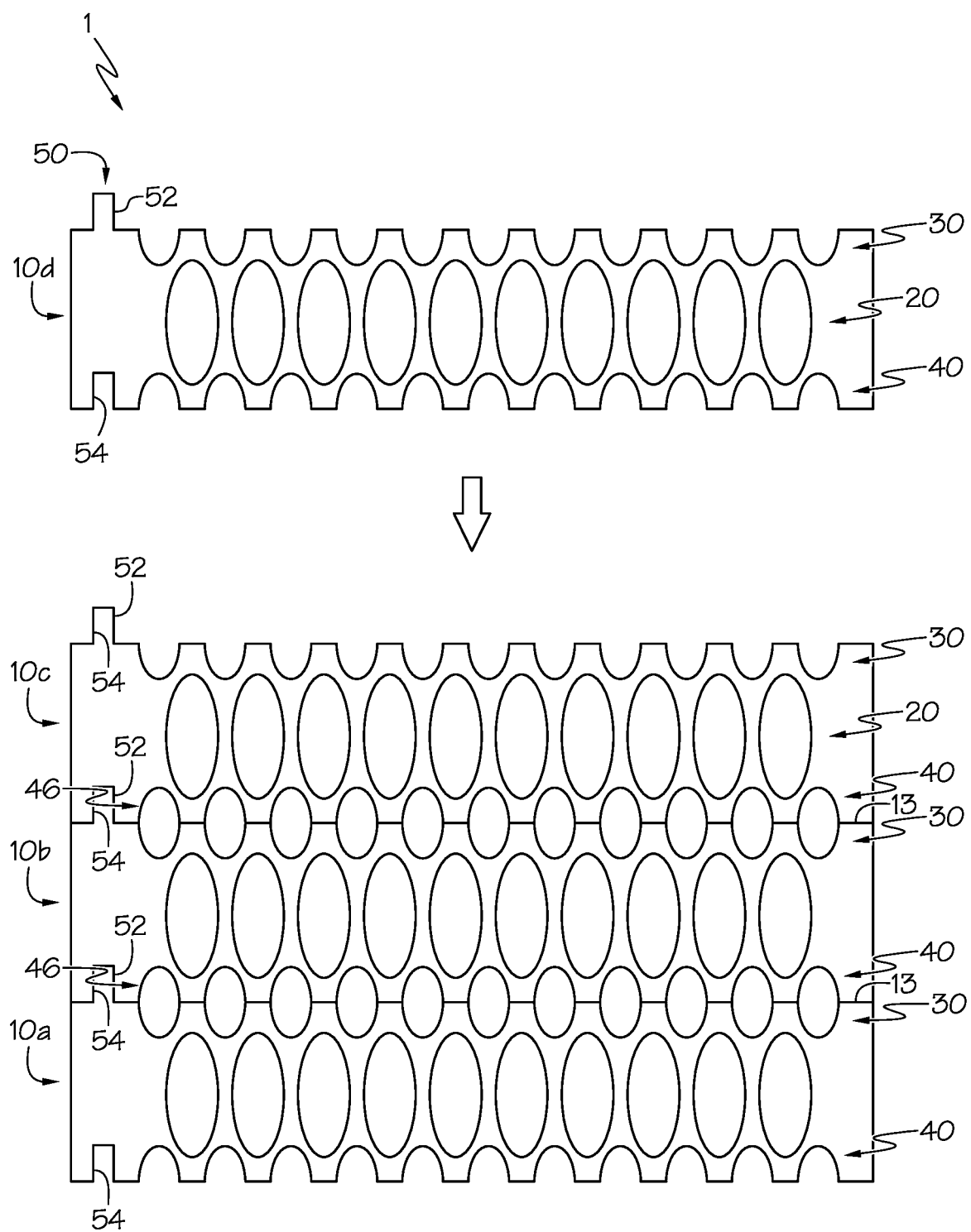
FIG. 6 depicts an assembly of a heat exchanger, according to one or more embodiments shown and described herein.

As will be described in greater detail, the one or more partial fluid flow channels 30 and/or 40 of the substrate 10 may be combined with partial fluid flow channels of a second substrate, such as illustrated in FIG. 6, to create combined fluid flow channels 46 between the two substrates. However, it should be understood that in some embodiments, there might only be partial fluid flow channels formed on one of the first outer surface 12 or the second outer surface 14 as opposed to both of the first and second outer surfaces 12, 14.

Referring back to FIG. 2A, one or more internal fluid flow channels 20 may be formed within the body 11 of the substrate 10 such that an internal fluid flow channel 22 is completely and integrally formed in the body 11 of the substrate 10. For example, the one or more internal fluid flow channels 20 may have an outlet/inlet 21 formed within the sidewall 16 of the body 11 on opposite sides of the substrate 10 but are otherwise dimensioned so as to be completely encased within the body 11 between the first outer surface 12 and the second outer surface 14, and are fluidly isolated from the one or more and partial fluid flow channels 20, 30. As shown in the illustrated embodiment, there may be a plurality of internal fluid flow channels 20 formed and encased within the body 11 of the substrate 10, for example, two or more internal fluid flow channels, four or more internal fluid flow channels, six or more internal fluid flow channels, etc. Each of the internal fluid flow channels 20 may be positioned parallel to one another.

The one or more internal fluid flow channels 20 may include any cross-sectional shape (e.g., a circle, oval, rectangle, or any regular or irregular polygonal or non-polygonal shape). In some embodiments, the one or more internal fluid flow channels 20 may have large height to width (e.g., Z:Y) aspect ratios of 1 to 1, 1.5 to 1, 2 to 1, 2.5 to 1, 3 to 1, or the like. In some embodiments, each of the one or more internal fluid flow channels 20 may have the same cross-sectional shape, different cross-sectional shapes, or some combination thereof. Additionally, the one or more internal fluid flow channels 20 may have the same or different shapes from the one or more partial fluid flow channels 30,40 of the first and second outer surfaces 12, 14, when combined with subsequent partial fluid flow channels to form combined fluid flow channels 46, as illustrated in FIG. 6.

In the illustrated embodiment of FIGS. 2A and 2B, the one or more internal fluid flow channels 20 may be laterally offset (e.g., in the Y direction of the depicted coordinate axes) from the one or more partial fluid flow channels 30, 40.

By offsetting the positions of the partial fluid flow channels 30, 40 and internal fluid flow channels 20, a greater amount of space of the body 11 may be dedicated to providing fluid flow passages, which may lead to smaller wall or web thicknesses between fluid flow channels and, accordingly, reduced weight. For example, a wall or web thickness, T, between adjacent partial fluid flow channels 30, 40 may be about 20 mm or less, about 10 mm or less, etc. For example, the wall or web thickness, T, may be between about 5 mm to about 10 mm. A wall or web thickness, t, between adjacent internal fluid flow channels 20 may be greater than, less than, or equal to the wall or web thickness, T, between adjacent partial fluid flow channels 30, 40. In embodiments, a wall or web thickness, t, between adjacent internal fluid flow channels 20 may be less than the wall thickness, T, between adjacent partial fluid flow channels 30, 40, as shown in FIG. 2B. It is noted that through additive manufacturing, the wall or web thickness between the various fluid flow channels may be reduced as compared to fluid flow channels formed through conventional etching, carving, milling, extruding, or boring manufacturing processes, which may be thicker and/or non-uniform.

Referring again to FIG. 2A, in some embodiments, a flow direction 23 (i.e., the direction along which fluid flows through a flow channel) of the one or more of internal fluid flow channels 20 may run parallel to a flow direction 33, 43 of the one or more partial fluid flow channels 30, 40. In yet further embodiments, the flow direction 23 of the one or more internal fluid flow channels 20 may run at some non-zero angle relative to the flow directions 33, 43 of the one or more partial fluid flow channels 30, 40. For example, the flow direction 23 of the one or more internal fluid flow channels 20 may be perpendicular to the flow direction 33, 43 of the one or more partial fluid flow channels 30, 40 (e.g., such as in a cross-flow heat exchanger).

Figure 3:
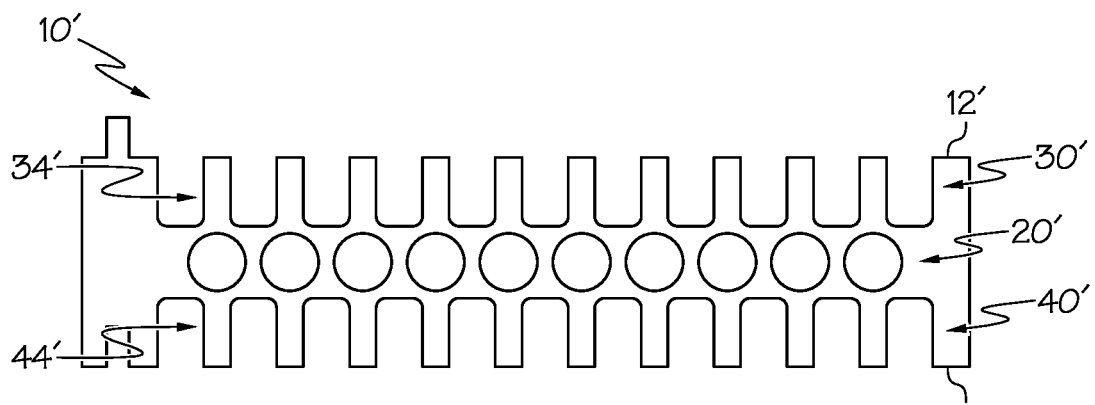
FIG. 3 illustrates a side view of another substrate for use as a layer of a heat exchanger, according to one or more embodiments shown and described herein.
Figure 4:
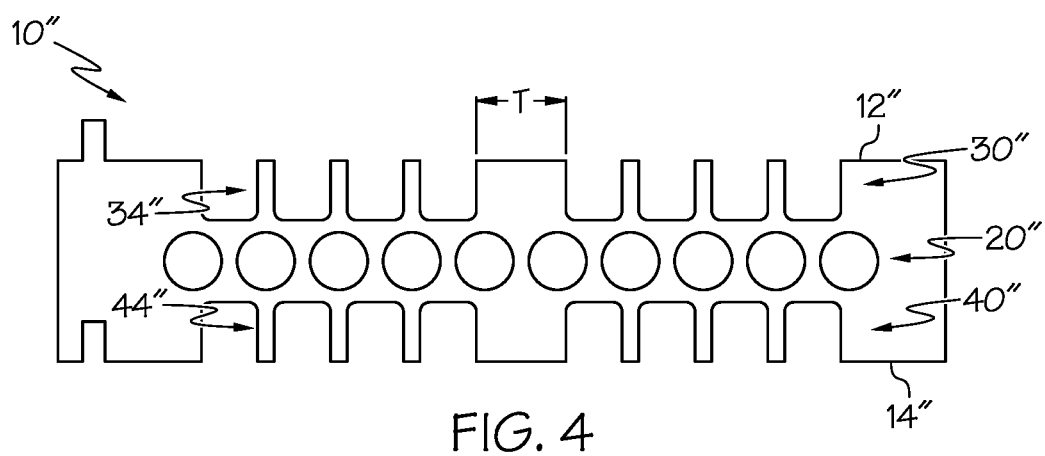
FIG. 4 depicts a side view of another substrate for use as a layer of a heat exchanger, according to one or more embodiments shown and described herein.
Figure 5:
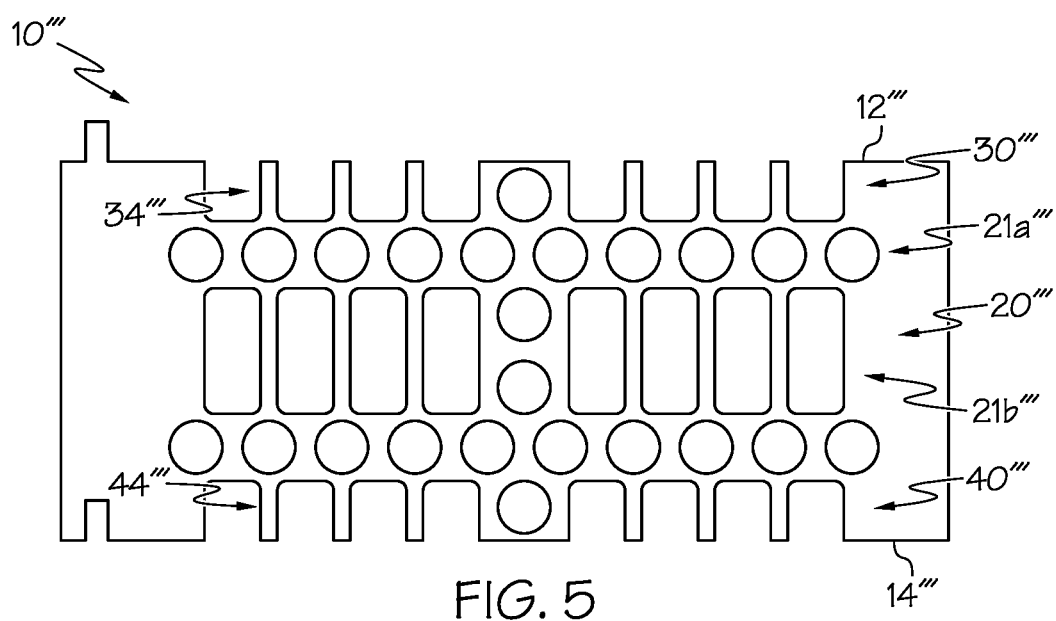
FIG. 5 depicts a side view of another substrate for use as a layer of a heat exchanger, according to one or more embodiments shown and described herein.

FIGS. 3-5 illustrate alternative embodiments of a substrate for use as a layer of a heat exchanger. Unless otherwise noted, features of these alternative embodiments are identical to those described herein with respect to FIGS. 2A and 2B.

FIG. 3 illustrates a first alternative embodiment of a substrate 10'. In this embodiment, the one or more partial fluid flow channels 30', 40' are rectangular in cross-section, and the internal fluid flow channels 20' are circular in cross-section. The rectangular shape of the one or more partial fluid flow channels 30', 40' forms a plurality of fins 34', 44' along the first and second outer surfaces 12', 14' of the substrate 10'. Formation of fins along the first and second outer surfaces 12', 14' may lead to increased thermal compliance with desired thermal objectives. Fins placed toward the outer edges of the substrate 10' may be thicker than interior fins to provide for increased bonding surface/strength.

FIG. 4 illustrates a second alternative embodiment of a substrate 10". In this embodiment, the one or more partial fluid flow channels 30", 40" are rectangular, and the one or more internal fluid flow channels 20" are circular in cross-section. The rectangular shape of the one or more partial fluid flow channels 30", 40" forms a plurality of fins 34", 44" along the first and second outer surfaces 12", 14" of the substrate 10", similar to the embodiment illustrated in FIG. 3. However, in the present embodiment, spacing between at least two adjacent partial fluid flow channels 30", 40" is increased resulting in an increased wall thickness, T, in at least one location (e.g., a center of the substrate 10). Such increased wall thickness may provide a thicker support section, thereby increasing mechanical strength, while thinner fins may increase thermal compliance. Additionally, an increased wall thickness, T, in at least one location may enable high-pressure operations and/or allow for thinner adjacent fins.

In some embodiments, multiple layers of enclosed fluid flow passages may be formed within a single substrate. For example, FIG. 5 illustrates a third alternative embodiment of a substrate 10''' with multiple layers of internal fluid flow channels 20'''. In this embodiment, the one or more partial fluid flow channels 30''', 40''' are rectangular, and a first portion 21a''' of the internal fluid flow channels 20''' are circular in cross-section and a second portion 21b''' of the internal fluid flow channels 20''' are rectangular in cross section. The rectangular shape of the first and second partial fluid flow channels 30''', 40''' forms a plurality of fins 34''', 44''' along the first and second outer surfaces 12''', 14''' of the substrate 10''', similar to the embodiment illustrated in FIGS. 3 and 4. In this embodiment, multiple layers of internal fluid flow channels 20''' may be formed within a single substrate (e.g., two or more layers, three or more layer, four or more layers, etc.). It is noted that though the one or more internal fluid flow channels 20''' are illustrated as including varying cross-sectional shapes (e.g., rectangles and circles), the one or more internal fluid flow channels 20''' may all have the same shape. Additionally, the number of internal fluid flow channels 20''' per layer may be varied. For example, in some embodiments, one or more internal fluid flow channels 20''' may be aligned within the row of partial fluid flow channels 30''', 40''', as illustrated in FIG. 5.

Referring again to FIGS. 2A and 2B, in some embodiments, the substrate 10 may further include an alignment mechanism 50. The alignment mechanism 50 may be any structure that aids in alignment and/or stacking of the first substrate 10 with a subsequent substrate. For example, the alignment mechanism 50 may include an alignment protrusion 52 formed on the first outer surface 12 and an alignment recess 54 formed within the second outer surface 14. The alignment protrusion 52 may extend from the first outer surface 12 so as to interlock with an alignment recess of a subsequent substrate, as will be described in more detail below with reference to FIG. 6. Similarly, the alignment recess 54 of the substrate 10 may extend from the second outer surface 14 and into the body 11 of the first substrate 10 so as to be capable of receiving an alignment protrusion of another substrate. The alignment protrusion 52 and recess 54 may be positioned directly across from one another along the Z-direction of the depicted coordinate axes. In some embodiments, multiple alignment mechanisms 50 may be included without departing from the scope of the present disclosure (e.g., multiple alignment protrusions and alignment recesses). It is noted that while the alignment protrusion 52 and recess 54 are each illustrated as having a rectangular cross-section, other cross sections are contemplated and possible (e.g., rounded, triangular, or the like). In some embodiments, the alignment protrusion 52 and the alignment recess, may provide an interlocking joint that resists separation of the substrate 10 from a subsequent substrate in the Z-direction of the depicted coordinate axes. For example, a sliding dovetail joint may aid in supporting high pressure applications. The alignment protrusion 52 and alignment recess 54 may extend across an entire length of the first and second outer surfaces 12, 14 respectively in the X direction of the depicted coordinate axes. In one embodiment, the alignment protrusion 52 and alignment recess 54 may extend continuously across an entire length of the respective first and second outer surfaces 12, 14 in the X direction, as shown in FIG. 2A. Alternatively, discontinuous alignment protrusions 52 and alignment recesses 54 are contemplated, such as a plurality of alignment protrusions 52 and alignment recesses 54 spaced apart evenly or unevenly in the X direction. It is further contemplated that the alignment protrusion 52 and alignment recess 54 may only extend across a portion of the respective first and second outer surfaces 12, 14 (for example, protrusions and recesses may be provided adjacent the four corners of a rectangular plate).

As noted above, the various features of the substrate 10 may be integrally formed such as through additive manufacturing. That is, the substrate 10 including the first and second partial fluid flow channels 30, 40, the internal fluid flow channels 20, and the alignment mechanism 50 may be formed integrally through additive manufacturing. Referring to FIG. 2B, the direction of build, or printing, may be along the X-axis of the depicted coordinate axes (i.e., into/out of the page). By building along the X-axis, down-skin surfaces on any pressurized channels may be eliminated. Down-skin surfaces refer to surfaces that are formed above loose powder, which may lead to lower surface quality (e.g., due to partial sintering of loose powder). Additionally, by building along the X-axis, no build supports may be needed. However, other build directions (e.g., along the Y-axis and/or the Z-axis) are also contemplated and possible.

Additive printing techniques include, for example, selective laser sintering (SLS), direct metal laser sintering (DMLS), and other three dimensional printing (3DP) modalities. The materials can include stainless steel, aluminum, titanium, Inconel 625, Inconel 718, cobalt chrome, among other metal materials. In addition, ceramics may be used for very high-temperature applications. In each of these powder-based fabrication methods, powdered material is melted or sintered to form each part layer. For example, the SLS process utilizes powdered plastic materials that are selectively sintered by a laser layer-by-layer. Other types of additive manufacturing techniques include 3D printing including stereolithography (SLA), jetted photopolymer, or ink jet printing. Other types of additive printing include solid-based processes, which use non-powdered materials that are layered one on top of another and subsequently cut out. These methods includes laminated object manufacturing (LOM) or fused deposition modeling (FDM). Any of the above techniques may be utilized to form the integral heat exchangers of the present invention.

In some embodiments, the substrate 10 may not be additively manufactured, or may only be partially additively manufactured. For example, in some embodiments, substrate 10 may be a preformed metal substrate. The first and second partial fluid flow channels 30, 40 may be formed through milling, etching (e.g., chemical etching), carving, or the like. However, it is noted that fluid flow channels formed by such milling and/or etching may be limited to the cross-sectional shapes that may be formed (e.g., half-circles). It is further noted that etching/milling processes typically result in relatively thick walls between flow channels, which may lead to increased weight, as compared to an additively manufactured substrate. The internal fluid flow channels 20 may be bored through the thickness of the metal substrate. The alignment protrusion 52 and/or alignment recess 54 may be carved, milled, and/or etched. In some embodiments, the alignment protrusion 52 may be separately bonded to the first outer surface 12 of the metal substrate. In another embodiment, additive manufacturing may be used to partially form the substrate 10. For example, an intermediate substrate may be additively manufactured with planar outer surfaces 12, 14 and internal fluid flow channels 20 with relatively thin walls therebetween, and the final substrate 10 may be completed by using a subtractive process (e.g., milling, etching) to form the first and second partial fluid flow channels 30, 40 in the planar outer surfaces 12, 14. Alignment mechanism 50 may be formed in the intermediate or final substrate 10 by any method discussed above, including additive, subtractive, bonding or any combination thereof.

FIG. 6 illustrates an assembly of a heat exchanger 1 (e.g., the heat exchanger core). For example, the heat exchanger 1 may have at least a first substrate 10*a* and a second substrate 10*b*, and may also include a third substrate 10*c*, a fourth substrate 10*d*, or more. Each of the substrates may be substantially identical to one another and may be as described above in reference to FIGS. 2A-5.

As noted above in regard to FIG. 1, the method 200 includes assembling the heat exchanger 1 (step 206), which includes, with reference to FIG. 6, coupling or bonding the first substrate 10*a* to a second substrate 10*b*. As noted above, the second substrate 10*b* may be substantially identical for the first substrate 10*a* such that one or more partial fluid channel 30, 40 are formed within a first outer surface 12 and a second outer surface 14 of both the first and second substrates 10*a*, 10*b*. Mounting the second substrate 10*b* to the first substrate 10*a* combines the one or more partial fluid flow channels 30 formed on the of the first outer surface 12 of the first substrate 10*a* with the one or more partial fluid flow channels 40 formed on the second outer surface 14 of the second substrate 10*b* to form one or more combined fluid flow channels 46. Subsequent layers (e.g., third substrate 10*c*, fourth substrate 10*d*, etc.) may be added to form additional combined fluid flow channels 46, until a desired number of fluid flow channels (e.g., including internal fluid flow channels 20 and combined fluid flow channels 46) are provided.

As noted above, to aid in alignment of the one or more partial fluid flow channels 30, 40, the alignment protrusion 52 (or multiple alignment protrusions) of the first substrate 10*a* may be positioned within an alignment recess 54 (or multiple alignment recesses) of the second substrate 10*b* to ensure proper alignment of the partial fluid channels 30, 40 of the first and second substrates 10*a*, 10*b*. The substrates 10*a*, 10*b* may be bonded to each other through, for example, diffusion bonding of each layer at the interface 13 between the two layers. Diffusion bonding may eliminate the need for hot isostatic press processes, thereby improving manufacturability of the heat exchanger 1. As noted above, additional substrates (e.g., third substrate 10*c*, fourth substrate 10*d*, etc.) may be added as desired. In some embodiments, the alignment recess(es) and/or alignment protrusion(s) may also serve as a location feature for mechanical fasteners (e.g., bolts, pins, screws, etc.) to extend therethrough to provide an alternative primary retention mechanism or a secondary retention mechanism for coupling the first substrate 10*a* to a subsequent substrate 10*b*. Prior to assembling the heat exchanger 1, and as provided in optional step 204 of the method 200 in FIG. 1, the various substrates may be inspected (e.g., visually inspected) for tolerances and/or mechanical defects, which may be otherwise difficult to perform with other heavier, monolithically manufactured heat exchangers.

Figure 7A:
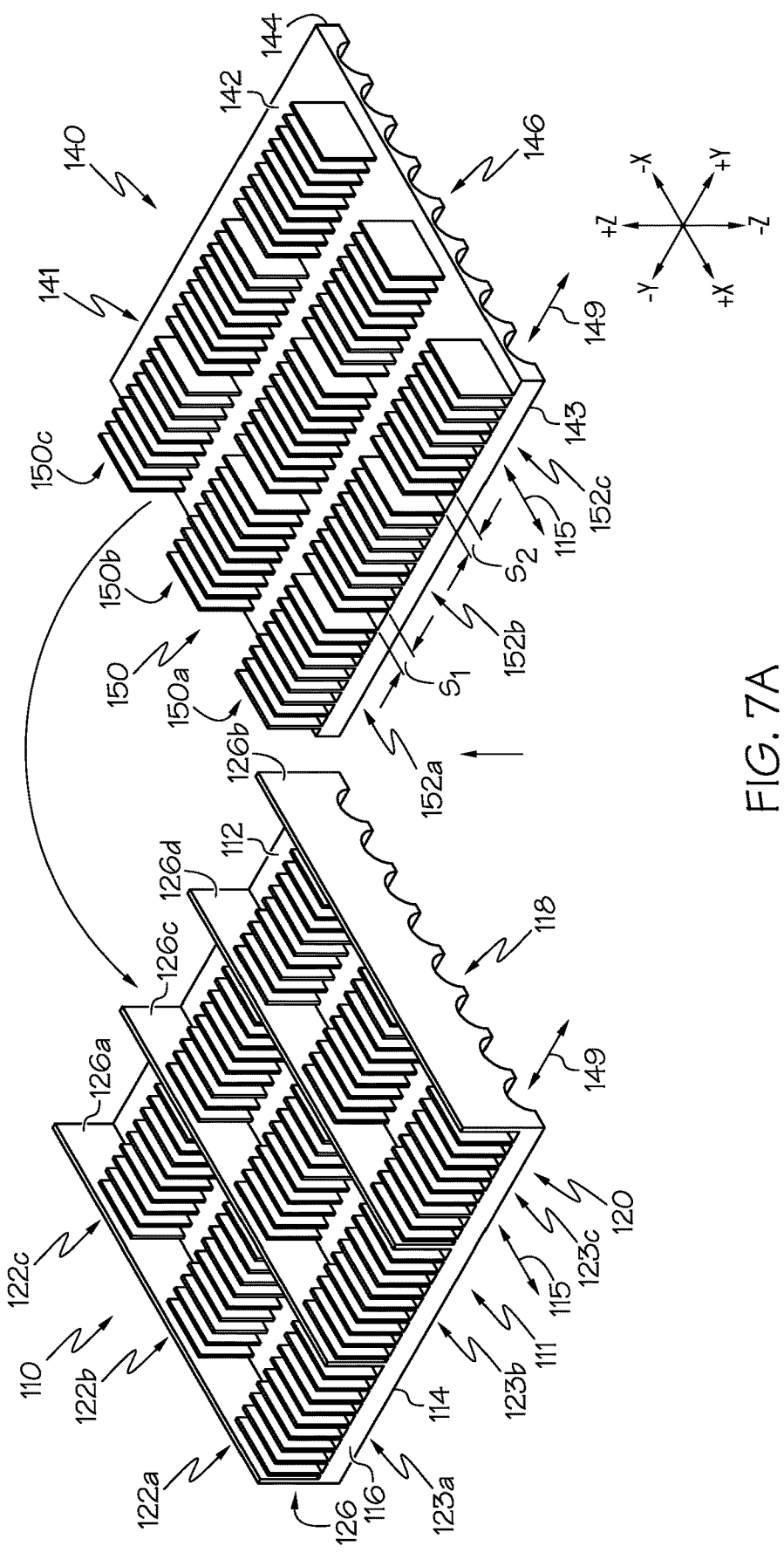
FIG. 7A depicts supporting and non-supporting substrate layers for use as layers of a heat exchanger, according or one or more embodiments shown and described herein.
Figure 7B:
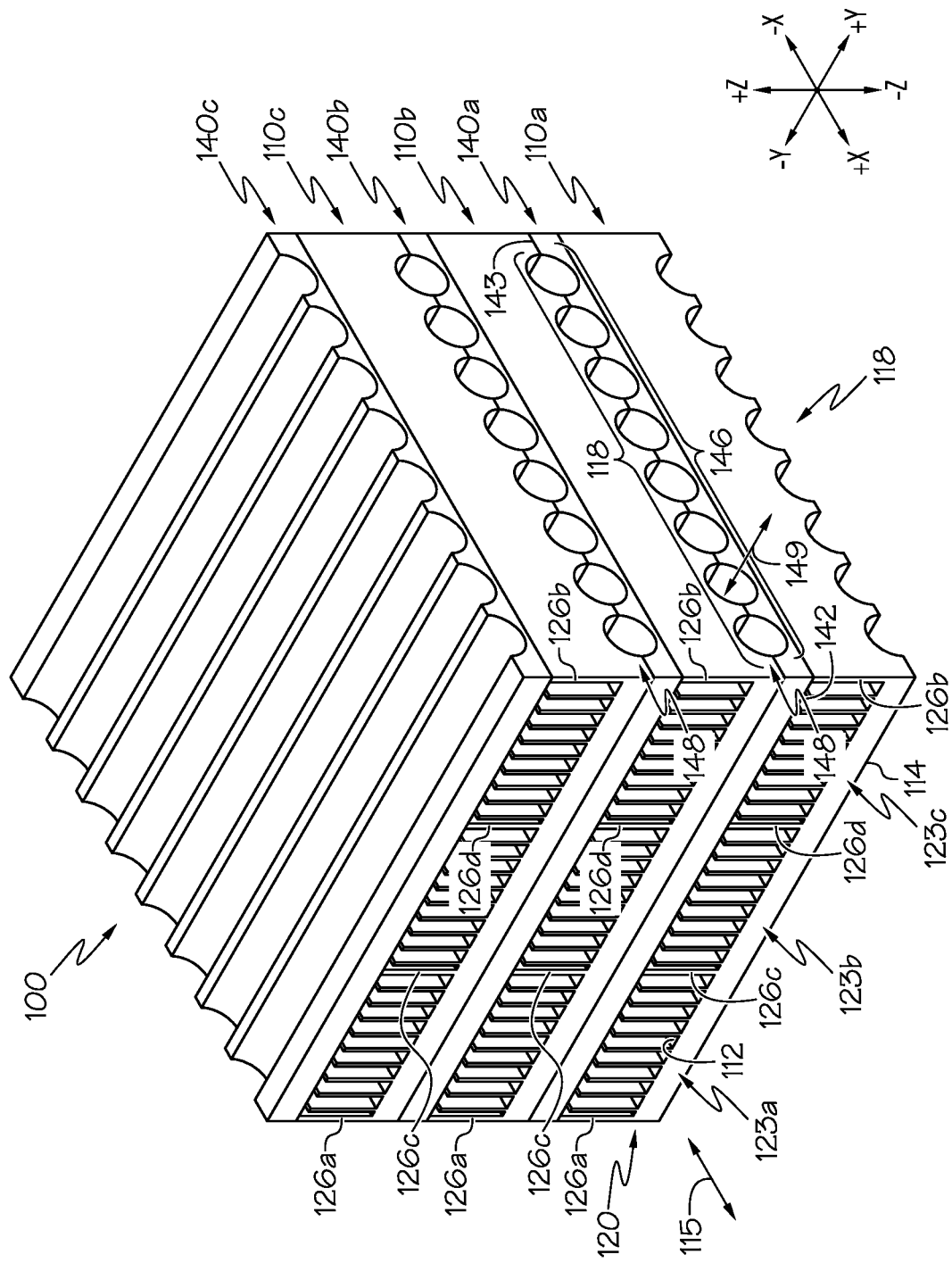
FIG. 7B depicts a perspective view of a heat exchanger assembled from the supporting and non-supporting substrate layers of FIG. 7A, according to one or more embodiments shown and described herein.
Figure 7C:
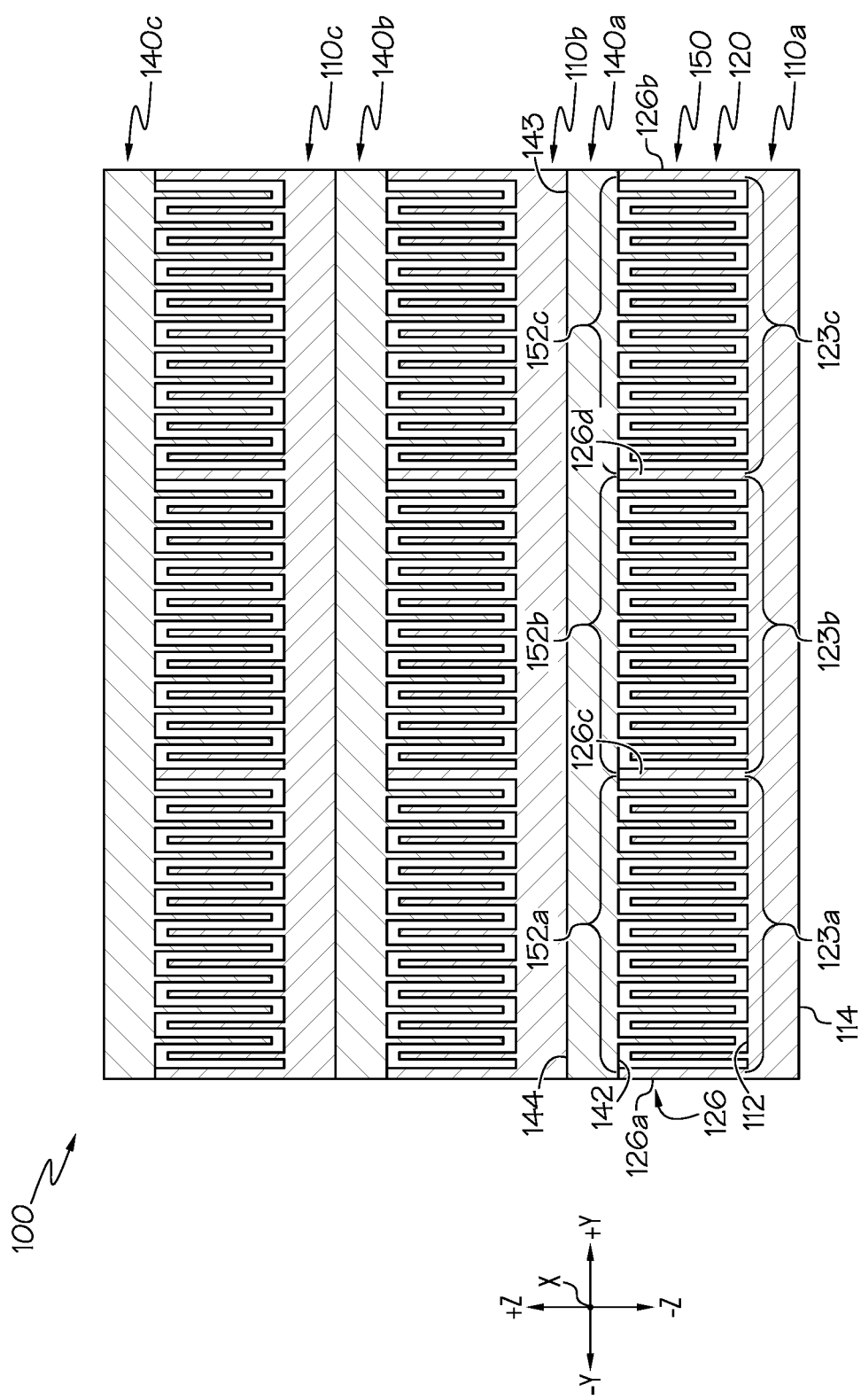
FIG. 7C depicts a side view of the heat exchanger of FIG. 7B, according to one or more embodiments shown and described herein.

FIG. 7A illustrates an alternative embodiment of substrate layers for production of a heat exchanger 100, illustrated in FIGS. 7B and 7C. In this embodiment, the heat exchanger 100 may be formed from one or more supporting substrate layers 110 layered with one or more non-supporting substrates layers 140. As with previous embodiments, each of the substrate layers 110, 140 may be additively manufactured and diffusion bonded or otherwise coupled to one another. However, other manufacturing processes are also contemplated and possible.

The supporting substrate layer 110 may include a base plate 111 having a first outer surface 112 and a second outer surface 114 opposite the first outer surface 112. The first and second outer surfaces 112, 114 may be parallel and coextensive with one another. A sidewall 116 may extend between the first outer surface 112 and the second outer surface 114. The sidewall 116 may be perpendicular to both the first outer surface 112 and the second outer surface 114 and extend along an outer perimeter of the first outer surface 112 and the second outer surface 114. For example, where the overall shape of the supporting substrate layer 110 is rectangular, there may be four sidewalls.

A first plurality of erect fins 120 may be formed (e.g., through additive manufacturing) and extend from the first outer surface 112 of the base plate 111. Each fin may be erect so as to extend generally parallel to the vertical direction (i.e., the Z-axis of the depicted coordinate axes). Each of the fins of the first plurality of erect fins 120 may have a thickness of about 2 mm to about 10 mm along the Y direction of the depicted coordinate axes and may have a length (along the X direction) and a height (along the Z direction) that are larger than the width-wise dimension of the fin. The lengthwise dimension of the plurality of erect fins 120 may be arranged parallel to the flow direction 115, as illustrated.

The first plurality of erect fins 120 may be arranged in two or more discrete rows of erect fins (e.g., row 122*a*, 122*b*, and/or 122*c*, though a greater number of rows are contemplated and possible) that extend in a line transverse to the flow direction 115 of fluid through the first plurality of erect fins 120 (i.e., along the Y direction of the depicted coordinate axes). Each of the rows 122*a*, 122*b*, and/or 122*c* may be arranged parallel to one another and extend across the substrate along the Y-axis of the depicted coordinate axes.

Two or more attachment walls 126 may be formed and extend from the first outer surface 112 of the base plate 111 to a distance (i.e., height) greater than the first plurality of erect fins 120. The two or more attachment walls 126 may thereby provide attachment points at which the non-supporting substrate layer 140 may be bonded (e.g., through diffusion bonding) or otherwise coupled to the non-supporting substrate layer 140 without contacting the first plurality of erect fins 120. The two or more attachment walls 126 include at least a first attachment wall 126*a* and a second attachment wall 126*b*. The first and second attachments walls 126*a*, 126*b* may be arranged at either end of the first plurality of erect fins 120 in the Y direction of the depicted coordinate axes such that the first plurality of erect fins 120 are arranged completely between the first attachment wall 126*a* and the second attachment wall 126*b*. In some embodiments, and as illustrated, additional attachment walls may be arranged between the first attachment wall 126*a* and the second attachment wall 126*b*, such as a third attachment wall 126*c* and/or a fourth attachment wall 126*d*. The third attachment wall 126*c* and/or the fourth attachment wall 126*d* may divide the first plurality of erect fins 120 into two or more discrete groups (e.g., group 123*a*, group 123*b*, and/or group 123*c*). Each group 123*a*, 123*b*, 123*c* may have an equal number of erect fins or an unequal number of erect fins.

The two or more attachment walls 126 may have a thickness in the Y direction of the depicted coordinate axes that is greater that the thickness of the fins of the first plurality of erect fins 120. In yet further embodiments, the thickness of the two or more attachment walls 126 may be less than or equal to the thickness of the first plurality of erect fins 120. It is noted that while the two or more attachment walls 126 are illustrated as having a uniform thickness along their lengths in the X direction of the depicted coordinate axes, in some embodiments, the two or more attachment walls 126 may have more truss-like frames such that openings are formed through the thicknesses of the two or more attachment walls. Such openings may provide for desirable weight reduction. In some embodiments, only the internally arranged attachment wall(s) (e.g., third attachment wall 126c and/or fourth attachment wall 126d) may include openings formed therethrough, while the first and second attachment walls 126a, 126b are solid without any openings formed therein, to prevent fluid from leaking from the heat exchanger.

Similar to embodiments described above, formed in the second outer surface 114 of the base plate 111 may be one or more partial fluid flow channels 118. The one or more partial fluid flow channels 118 may extend along the entire length of the second outer surface 114 in the Y direction of the depicted coordinate axes. The one or more partial fluid flow channels 118 may have any cross-sectional shape, for example, a portion of a circle, oval, rectangle, or any regular or irregular polygonal or non-polygonal shape. In the illustrated embodiment, the one or more partial fluid flow channels 118 may include a plurality of partial fluid flow channels 118 formed within the second outer surface 114, for example, two or more partial fluid flow channels, four or more partial fluid flow channels, six or more partial fluid flow channels, etc. Each of the one or more partial fluid flow channels 118 may run parallel to each other across the base plate 111. Each of the one or more partial fluid flow channels 118 may have the same shape or different shapes. As will be described in greater detail, the one or more partial fluid flow channels 118 of the supporting substrate layer 110 may be combined with one or more partial fluid flow channels 146 formed in a non-supporting substrate layer 140 to form one or more combined fluid flow channels 148, as illustrated in FIG. 7B.

The non-supporting substrate layer 140 may include a base plate 141 having a first outer surface 142 and a second outer surface 143 opposite the first outer surface 142. The first and second outer surfaces 142, 143 may be parallel and coextensive with one another. A sidewall 144 may extend between the first outer surface 142 and the second outer surface 143. The sidewall 144 may be perpendicular to both the first outer surface 142 and the second outer surface 143 and extend along an outer perimeter of the first outer surface 142 and the second outer surface 143. For example, where the overall shape of the non-supporting substrate layer 140 is rectangular, there may be four sidewalls.

A second plurality of erect fins 150 may be formed (e.g., through additive manufacturing) and extend from the first outer surface 142 of the base plate 141. Each fin may be erect so as to extend generally parallel to the vertical direction (i.e., the Z-axis of the depicted coordinate axes). Each of the fins of the second plurality of erect fins 150 may have a thickness of about 5 mm to about 10 mm along the Y direction of the depicted coordinate axes and may have a length (along the X direction) and a height (along the Z direction) that are larger than the width-wise dimension of the fin. The lengthwise dimension of the second plurality of erect fins 150 may be arranged parallel to the flow direction 115.

The second plurality of erect fins 150 may be arranged in two or more discrete rows of erect fins (e.g., row 150a, 150b, and/or 150c, through a greater number of rows are contemplated and possible) that extend in a line transverse to the flow direction 115 of fluid through the second plurality of erect fins 150 (i.e., along the Y direction of the depicted coordinate axes). Each of the rows 150a, 150b, and/or 150c may be arranged parallel to one another and extend across the substrate along the Y-axis of the depicted coordinate axes.

Each row may be separated into two or more groups (e.g., group 152a, group 152b, and/or group 152c). The two or more groups may be apparent due to an increased spacing (e.g., $s_1$, $s_2$) between adjacent groups as compared to spacing between adjacent fins within a single group. The increased spacing may allow for insertion of the attachment walls 126c and/or 126d to extend between and separate the second plurality of erect fins into the two or more groups, as illustrated in FIG. 7C.

Similar to embodiments described above, formed in the second outer surface 143 of the base plate 141 may be one or more partial fluid flow channels 146. The one or more partial fluid flow channels 146 may extend along the entire length of the second outer surface 143 in the Y direction of the depicted coordinate axes. The one or more partial fluid flow channels 146 may have any cross-sectional shape, for example, a portion of a circle, oval, rectangle, or any regular or irregular polygonal or non-polygonal shape. In the illustrated embodiment, the one or more partial fluid flow channels 146 may include a plurality of partial fluid flow channels 146 formed within the second outer surface 143, for example, two or more partial fluid flow channels, four or more partial fluid flow channels, six or more partial fluid flow channels, etc. Each of the one or more partial fluid flow channels 146 may run parallel to each other across the substrate 10. Each of the one or more partial fluid flow channels 146 may have the same shape or different shapes. As will be described in greater detail, the one or more partial fluid flow channels 146 of the non-supporting substrate layer 140 may be combined with one or more partial fluid flow channels 118 formed in a supporting substrate layer 110 to form one or more combined fluid flow channels 148, as illustrated in FIG. 7B.

It is further noted, that though not shown, the supporting and non-supporting substrate layers 110, 140 may include one or more alignment mechanisms to aid in aligning the one or more partial fluid flow channels 118, 146. For example, a protrusion may be formed on one of the second outer surface 114 of the supporting substrate layer 110 or the second outer surface 143 of the non-supporting substrate layer 140 and a matching recess may formed on the other of the second outer surface 114, 143 of the supporting substrate layer 110 or the non-supporting substrate layer 140. During assembly, the protrusion may be mated with the recess to aid in alignment and assembly, similar to the embodiments described above with respect to FIGS. 2A-2B and 6.

In some embodiments, when forming the supporting and non-supporting substrate layers 410, 140 with additive manufacturing (e.g., DMLM) the direction of build may be along the Z direction of the depicted coordinate axes. This direction may optimize fin formation so as to produce fins having thinner profiles (e.g., less than about 20 mm thick, less than about 15 mm thick, less than 12 mm thick, between about 5 mm to about 20 mm thick, such as between about 15 mm to about 20 mm, or the like). However, it is noted that other build directions are contemplated and possible (e.g., along the Y direction and/or along the X direction). Additionally, it is noted that the supporting substrate layer 110 and the non-supporting substrate layer 140 may be formed through other manufacturing processes (e.g., mechanically coupling fins to a surface of a substrate and etching, milling, and/or carving partial fluid flow channels on an opposite surface) such as described herein.

During the assembly step 206 of the method 200 illustrated in FIG. 1, the non-supporting substrate layer 140 may be rotated about the X axis of the depicted coordinate axes and placed on the two or more attachment walls 126 of the supporting substrate layer 110. As illustrated in FIGS. 7B and 7C, a heat exchanger 100 as depicted is formed from alternating layers of supporting and non-supporting substrate layers 110, 140. It is noted that a heat exchanger 100 includes at least a first supporting substrate layer 110a and a first non-supporting substrate layer 140a. When assembled, the first outer surface 142 of the non-supporting substrate layer 140 sits on the two or more attachment walls 126 (e.g., 126a-126d) of the supporting substrate layer 110. Each adjacent fin of the first plurality of erect fins 120 are thereby separated from one another by a fin of the second plurality of erect fins 150. In this way, one or more fluid flow paths are formed by the first plurality of erect fins 120, the second plurality of erect fins 150, and the two or more attachment walls 126.

As illustrated in FIGS. 7B and 7C, a subsequent supporting substrate layer 110b may be layered on top of the second outer surface 143 of the non-supporting substrate layer 140a, in the Z direction of the depicted coordinate axes, such that the plurality of partial fluid flow channels 118 of the subsequent supporting substrate layer 110b and the plurality of partial fluid flow channels 146 of the non-supporting substrate layer 140 are combined to form a plurality of combined fluid flow channels 148 that define a plurality of fluid flow paths. The flow direction 149 of the combined fluid flow channels 148 may be parallel to or transverse to the flow direction 115 of the one or more fluid flow paths provided by the first plurality of erect fins 120, the second plurality of erect fins 150, and the two or more attachment walls 126 (as illustrated in FIG. 7B). Additional non-supporting substrate layers (e.g., 140b, 140c) and supporting substrate layers (110c) may be added as desired to form the desired heat exchanger 100. As with previous embodiments, the various layers may be diffusion bonded or otherwise coupled to one another. Prior to bonding the various layers together, each substrate layer may be inspected for defects, geometrical tolerances, and/or hydraulic and/or thermal performance characteristics.

As noted above, methods of manufacturing may include additional processing steps. Such additional processing steps may be performed before and/or after coupling the various layers to one another. For example, further processing steps may include, but are not limited to coating, electroplating, or other surface treatments.

It should now be understood that embodiments as described herein are directed to various heat exchanger embodiments and methods of manufacturing. For example, heat exchangers, according to the present disclosure, may be manufactured by forming layers or substrates wherein each layer has partial and/or whole integrally formed flow channels and/or fins. The substrates may then be stacked and coupled to one another. By forming heat exchangers in a layer-wise manufacturing process, each layer (substrate) may be separately inspected for tolerances and defects prior to coupling, for example by diffusion bonding. This may overcome current limitations in monolithically formed heat exchanges, where it is difficult to inspect for tolerances and/or mechanical defects. In some embodiments, one or more of the plates (or each plate) may be additively manufactured through, for example, direct metal laser melting (DMLM), which may simplify the powder removal process and eliminate possible trapped power. Additionally, forming a heat exchanger through layers may provide opportunity to coat, electroplate, or perform other types of surface treatments.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the present disclosure are provided by the subject matter of the following clauses.

A method of manufacturing a heat exchanger is provided. The method includes forming a first substrate by additively manufacturing a body defining a first outer surface and a second outer surface opposite the first outer surface, a first partial fluid flow channel formed within the first outer surface, a second partial fluid flow channel formed within the second outer surface, and at least one internal fluid flow channel completely formed within the body; and coupling the first substrate to a second substrate comprising a partial fluid flow channel formed within a surface of the second substrate such that the first partial fluid flow channel of the first substrate and the partial fluid flow channel of the second substrate combine to form a combined fluid flow channel.

The method of any preceding clause, further includes forming the second substrate by additively manufacturing a body defining a first outer surface and a second outer surface opposite the first outer surface, wherein a first partial fluid flow channel is formed within the first outer surface, the partial fluid flow channel is a second partial fluid flow channel formed within the second outer surface, and an internal fluid flow channel is completely formed within the body.

The method of any preceding clause, wherein the first substrate is coupled to the second substrate by diffusion bonding.

The method of any preceding clause, further includes inspecting the first substrate prior to coupling or diffusion bonding the first substrate to the second substrate.

The method of any preceding clause, wherein the first partial fluid flow channel is laterally offset from the internal fluid flow channel.

The method of any preceding clause, wherein formation of the first partial fluid flow channel and the second partial fluid flow channel are laterally offset from the internal fluid flow channel.

The method of any preceding clause, wherein the first partial fluid flow channel and the second partial fluid flow channel are directly opposite one another across the body of the first substrate.

The method of any preceding clause, wherein additively manufacturing the first substrate includes forming an alignment protrusion on the first outer surface and an alignment recess on the second outer surface, wherein coupling the first substrate to the second substrate includes aligning the alignment protrusion of the first substrate with an alignment recess formed in the second substrate.

The method of any preceding clause, wherein the first outer surface of the first substrate comprises a plurality of partial fluid flow channels including the first partial fluid flow channel, and the surface of the second substrate comprises a plurality of partial fluid flow channels such that, upon coupling, the plurality of partial fluid flow channels of the first substrate are aligned and combine with the plurality of partial fluid flow channels of the second substrate to form a plurality of combined fluid flow channels.

The method of any preceding clause, wherein the at least one internal fluid flow channel includes a plurality of internal fluid flow channels completely formed within the body.

A method of manufacturing a heat exchanger is provided. The method includes forming a supporting substrate layer including a body defining a first outer surface and a second outer surface opposite the first outer surface; forming a first plurality of erect fins extending from the first outer surface of the supporting substrate layer; forming two or more attachment walls extending from the first outer surface of the supporting substrate layer a distance greater than the first plurality of erect fins; forming a non-supporting substrate layer including a body defining a first outer surface and a second outer surface opposite the first outer surface; forming a second plurality of erect fins extending from the first outer surface of the non-supporting substrate layer; and mounting the non-supporting substrate layer to the supporting substrate layer such that the two or more attachment walls engage the first outer surface of the non-supporting substrate layer and each adjacent fin of the first plurality of erect fins are separated by a fin of the second plurality of erect fins.

The method of any preceding clause, wherein the first plurality of erect fins and the second plurality of erect fins each includes two or more rows of erect fins.

The method of any preceding clause, wherein the two or more attachment walls separate the first plurality of erect fins into two or more groups.

The method of any preceding clause, further includes forming one or more partial fluid flow channels within the second outer surface of the body of the supporting substrate layer.

The method of any preceding clause, wherein a flow direction of the one or more partial fluid flow channels is perpendicular to a flow direction through the first and second plurality of erect fins.

The method of any preceding clause, further including forming one or more partial fluid flow channels within the second outer surface of the body of the non-supporting substrate layer.

The method of any preceding clause, wherein a flow direction of the one or more partial fluid flow channels is perpendicular to a flow direction through the first and second plurality of erect fins.

A heat exchanger includes a supporting substrate layer including a body defining: a first outer surface and a second outer surface opposite the first outer surface; a first plurality of erect fins extending from the first outer surface of the supporting substrate layer; and two or more attachment walls extending from the first outer surface of the supporting substrate layer a distance greater than the first plurality of erect fins; and a non-supporting substrate layer comprising a body defining: a first outer surface and a second outer surface opposite the first outer surface; and a second plurality of erect fins extending from the first outer surface of the non-supporting substrate layer; wherein the first outer surface of the non-supporting substrate layer is bonded to the two or more attachment walls of the supporting substrate layer and each adjacent fin of the first plurality of erect fins are separated by a fin of the second plurality of erect fins.

The heat exchanger of any preceding clause, wherein the first plurality of erect fins and the second plurality of erect fins each includes two or more rows of erect fins.

The heat exchanger of any preceding clause, wherein the two or more attachment walls separate the first plurality of erect fins into two or more groups.

The heat exchanger of any preceding clause, further including one or more partial fluid flow channels formed within the second outer surface of the body of the supporting substrate layer.

The heat exchanger of any preceding clause, wherein a flow direction of the one or more partial fluid flow channels is perpendicular to a flow direction through the first and second plurality of erect fins.

A method of manufacturing a heat exchanger is provided. The method includes forming a first substrate and a second substrate, each of the first and second substrates comprising a body defining a first outer surface and a second outer surface opposite the first outer surface, a first plurality of partial fluid flow channels formed within the first outer surface, a second plurality of partial fluid flow channels formed within the second outer surface, and a plurality of internal fluid flow channels completely formed within the body, wherein the first and second substrates are at least partially formed by additive manufacturing; and bonding the first substrate to the second substrate such that the first plurality of partial fluid flow channels of the first substrate and the second plurality of partial fluid flow channels of the second substrate are aligned and combine to form a plurality of combined fluid flow channels.

The method of any preceding clause, wherein additive manufacturing is used to at least form the plurality of internal fluid flow channels.

The method of any preceding clause, wherein the plurality of partial fluid flow channels is formed by additive manufacturing.

The method of any preceding clause, wherein the plurality of internal fluid flow channels is separated by walls of thickness t, the plurality of combined fluid flow channels are separated by walls of thickness T, and t<T.

The method of any preceding clause, wherein a plurality of first substrates are coupled or bonded to a plurality of second substrates in alternating fashion to produce alternating layers of internal fluid flow channels and combined fluid flow channels.

What is claimed is:

1. A method of manufacturing a heat exchanger, comprising:
   forming a first substrate by additively manufacturing a body defining a first outer surface and a second outer surface opposite the first outer surface, a first partial fluid flow channel formed within the first outer surface, a second partial fluid flow channel formed within the second outer surface, and at least one internal fluid flow channel completely formed within the body; and
   coupling the first substrate to a second substrate comprising a partial fluid flow channel formed within a surface of the second substrate such that the first partial fluid flow channel of the first substrate and the partial fluid flow channel of the second substrate combine to form a combined fluid flow channel.

2. The method of claim 1, further comprising forming the second substrate by additively manufacturing a body defining a first outer surface and a second outer surface opposite the first outer surface, wherein a first partial fluid flow channel is formed within the first outer surface, the partial fluid flow channel is a second partial fluid flow channel formed within the second outer surface, and an internal fluid flow channel is completely formed within the body.

3. The method of claim 1, wherein coupling the first substrate to the second substrate is by diffusion bonding.

4. The method of claim 1, further comprising inspecting the first substrate prior to coupling the first substrate to the second substrate.

5. The method of claim 1, wherein the first partial fluid flow channel is laterally offset from the internal fluid flow channel.

6. The method of claim 1, wherein formation of the first partial fluid flow channel and the second partial fluid flow channel are laterally offset from the internal fluid flow channel.

7. The method of claim 6, wherein the first partial fluid flow channel and the second partial fluid flow channel are directly opposite one another across the body of the first substrate.

8. The method of claim 1, wherein additively manufacturing the first substrate comprises forming an alignment protrusion on the first outer surface and an alignment recess on the second outer surface, wherein coupling the first substrate to the second substrate comprises aligning the alignment protrusion of the first substrate with an alignment recess formed in the second substrate.

9. A method of manufacturing a heat exchanger comprising:
   forming a supporting substrate layer comprising a body defining a first outer surface and a second outer surface opposite the first outer surface;
   forming a first plurality of erect fins extending from the first outer surface of the supporting substrate layer;
   forming two or more attachment walls extending from the first outer surface of the supporting substrate layer a distance greater than the first plurality of erect fins;
   forming a non-supporting substrate layer comprising a body defining a first outer surface and a second outer surface opposite the first outer surface;
   forming a second plurality of erect fins extending from the first outer surface of the non-supporting substrate layer; and
   mounting the non-supporting substrate layer to the supporting substrate layer such that the two or more attachment walls engage the first outer surface of the non-supporting substrate layer and each adjacent fin of the first plurality of erect fins are separated by a fin of the second plurality of erect fins.

10. The method of claim 9, wherein the first plurality of erect fins and the second plurality of erect fins each comprises two or more rows of erect fins.

11. The method of claim 9, wherein the two or more attachment walls separate the first plurality of erect fins into two or more groups.

12. The method of claim 11, further comprising forming one or more partial fluid flow channels within the second outer surface of the body of the supporting substrate layer.

13. The method of claim 12, wherein a flow direction of the one or more partial fluid flow channels is perpendicular to a flow direction through the first and second plurality of erect fins.

14. The method of claim 11, further comprising forming one or more partial fluid flow channels within the second outer surface of the body of the non-supporting substrate layer.

15. The method of claim 14, wherein the one or more partial fluid flow channels are perpendicular to perpendicular to a flow direction through the first and second plurality of erect fins.

16. A heat exchanger comprising:
   a supporting substrate layer comprising a body defining:
      a first outer surface and a second outer surface opposite the first outer surface;
      a first plurality of erect fins extending from the first outer surface of the supporting substrate layer; and
      two or more attachment walls extending from the first outer surface of the supporting substrate layer a distance greater than the first plurality of erect fins; and
   a non-supporting substrate layer comprising a body defining:
      a first outer surface and a second outer surface opposite the first outer surface; and
      a second plurality of erect fins extending from the first outer surface of the non-supporting substrate layer;
   wherein the first outer surface of the non-supporting substrate layer is bonded to the two or more attachment walls of the supporting substrate layer and each adjacent fin of the first plurality of erect fins are separated by a fin of the second plurality of erect fins.

17. The heat exchanger of claim 16, wherein the first plurality of erect fins and the second plurality of erect fins each comprises two or more rows of erect fins.

18. The heat exchanger of claim 16, wherein the two or more attachment walls separate the first plurality of erect fins into two or more groups.

19. The heat exchanger of claim 18, further comprising one or more partial fluid flow channels formed within the second outer surface of the body of the supporting substrate layer.

20. The heat exchanger of claim 19, wherein a flow direction of the one or more partial fluid flow channels is perpendicular to a flow direction through the first and second plurality of erect fins.

* * * * *

UNITED STATES PATENT AND TRADEMARK OFFICE
CERTIFICATE OF CORRECTION

PATENT NO. : 11,686,537 B2
APPLICATION NO. : 17/223284
DATED : June 27, 2023
INVENTOR(S) : Jeffrey Douglas Rambo It is certified that error appears in the above-identified patent and that said Letters Patent is hereby corrected as shown below:

In the Claims

In Column 18, Line(s) 25 and 26, Claim 15, after "are perpendicular", delete "to perpendicular".

Signed and Sealed this
Fifth Day of September, 2023

Katherine Kelly Vidal
*Director of the United States Patent and Trademark Office*